N. BACIGALUPI.
SPRINKLING APPARATUS.
APPLICATION FILED MAY 21, 1910.
1,008,004.
Patented Nov. 7, 1911.
2 SHEETS—SHEET 1.
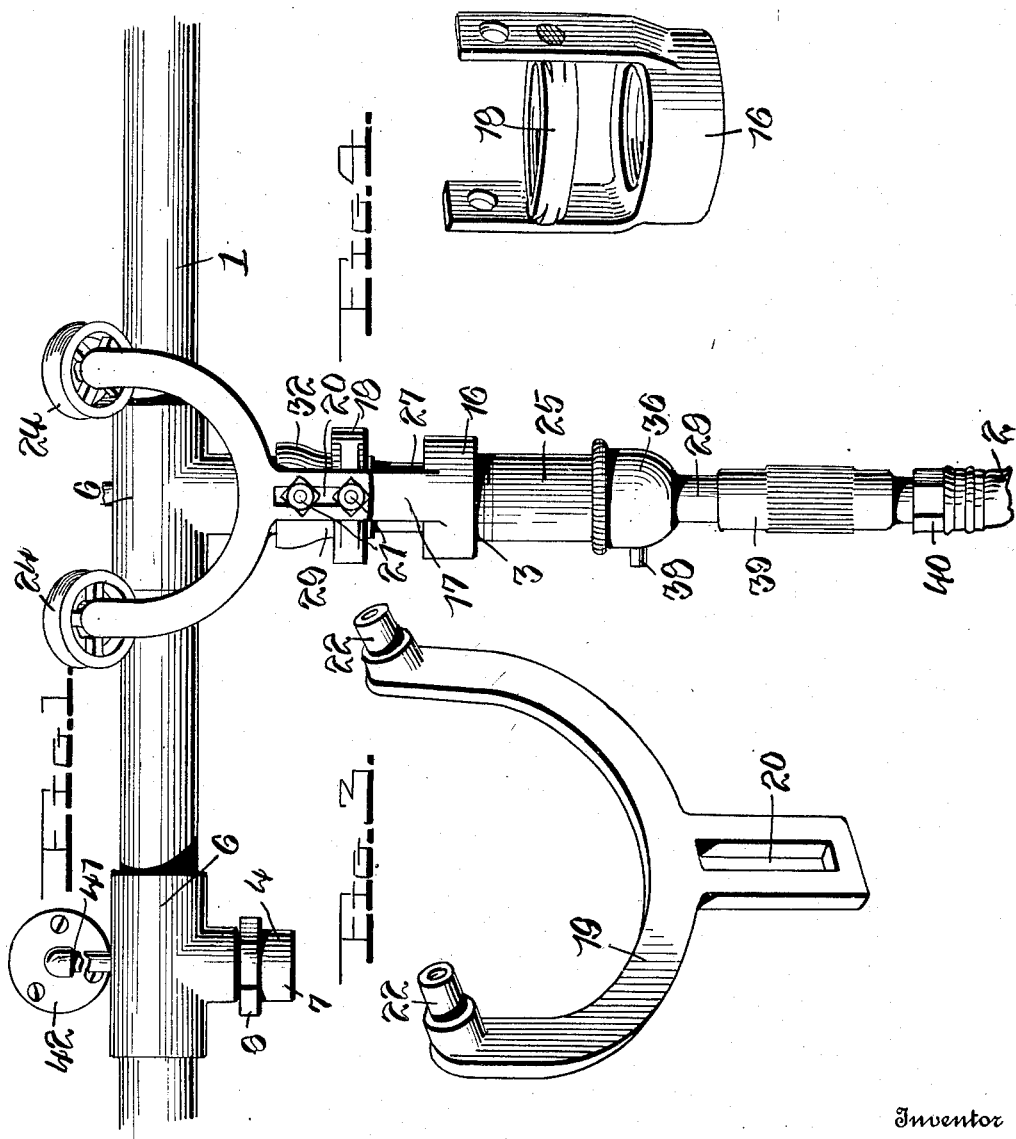
Witnesses
Chas. L. Grieshauer.
E. M. Ricketts
Inventor
N. Bacigalupi,
By Watson E. Coleman.
Attorney

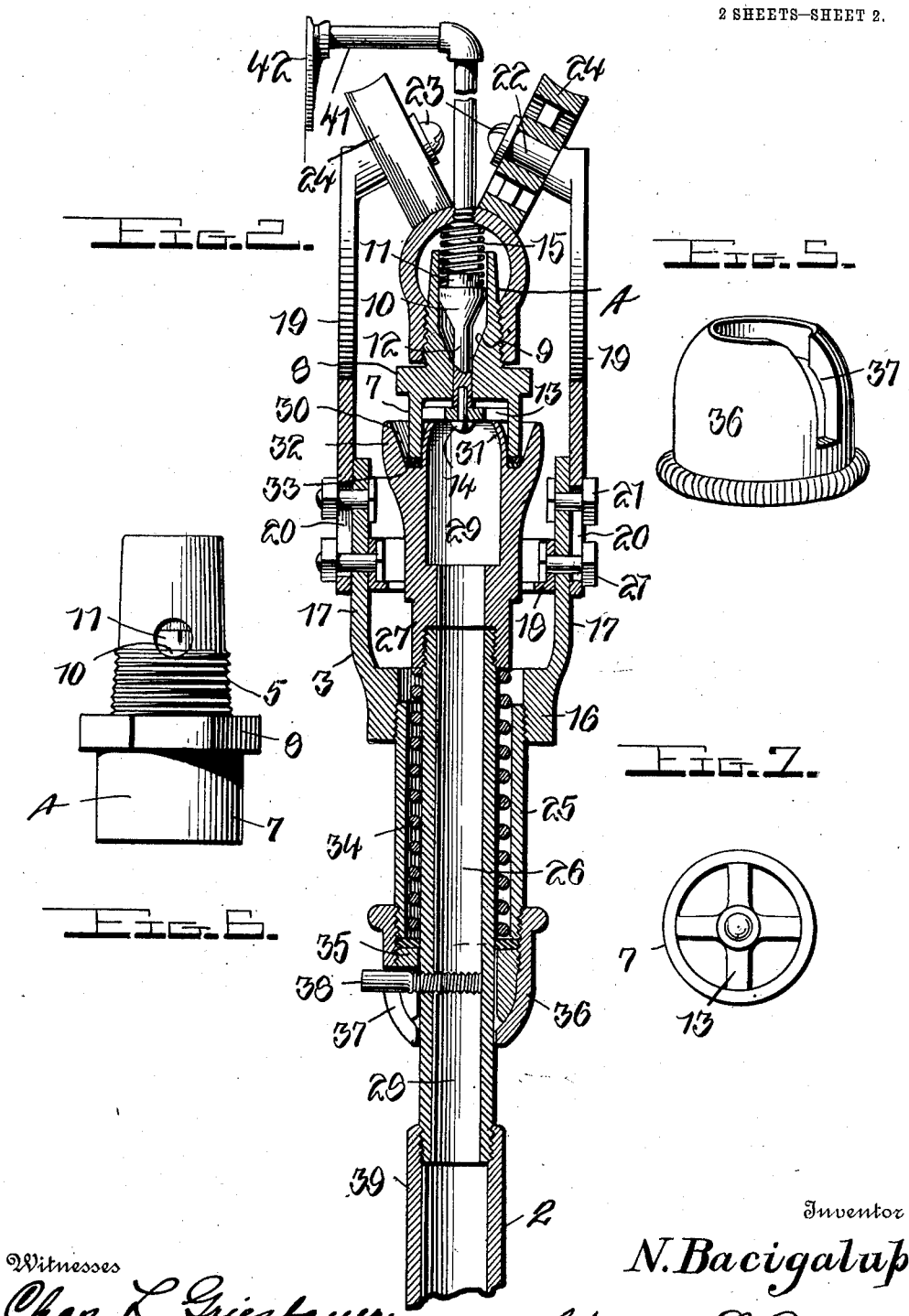

UNITED STATES PATENT OFFICE.

NATALIN BACIGALUPI, OF BABYLON, NEW YORK.

SPRINKLING APPARATUS.

1,008,004. Specification of Letters Patent. Patented Nov. 7, 1911.

Application filed May 21, 1910. Serial No. 562,662.

*To all whom it may concern:*

Be it known that I, NATALIN BACIGALUPI, subject of the King of Italy, residing at Babylon, Long Island, in the county of Suffolk and State of New York, have invented certain new and useful Improvements in Sprinkling Apparatuses, of which the following is a specification, reference being had to the accompanying drawings.

This invention relates to improvements in sprinkling apparatus used in greenhouses, stables, factories, and for analogous purposes, and more particular to the apparatus set forth in my present patent granted March 8, 1910, bearing No. 951,519.

The object of the present invention is to provide, in connection with the supply pipe having a plurality of flanges projecting from the lower side thereof and each having a valved outlet pipe, the carriage which is swung from and adapted to travel on the supply pipe, the discharge pipe which is movable vertically in and is carried by the carriage, the coupling at the upper end of the discharge pipe to detachably engage any of the outlet pipes and the spring to move the coupling upwardly, together with the discharge pipe, means to lock the discharge pipe and coupling in a lowered position when the coupling is disconnected from all of the outlet pipes and thereby facilitate the movement of the carriage to any desired position on the supply pipe.

With the above and other objects in view, the invention consists of the novel construction, combination and arrangement of parts, hereinafter fully described and claimed, and illustrated in the accompanying drawings in which:—

Figure 1 is a side elevation of an apparatus embodying my invention. Fig. 2 is a vertical sectional view of the same on a larger scale. Fig. 3, 4 and 5, are detail views in perspective of parts of the carriage. Figs. 6 and 7, are detail views in side elevation and bottom plan of parts of the valve.

In the drawings 1 denotes a supply pipe for water or other liquid and 2 denotes a discharge or outlet pipe which may be a hose or a pipe of other form. This pipe 2 has one of its ends connected to a carriage 3 adapted to travel along the pipe 1 which serves as a track, so that said end of the pipe 2 may be engaged with any one of the longitudinal series of the valve-controlled outlet connections 4 containing self-closing or spring seated valves. Each of the outlet connections 4 is in the form of a tubular member or pipe section having its intermediate portion externally screw threaded, as shown at 5, so that it may be screwed into one branch of a T-connection 6 which unites sections of the pipe 1. The reduced inner end of the pipe or member 4 is of cylindrical shape and formed with transverse openings, while the outer end of said pipe 4 has an enlarged cylindrical portion 7 and a flat faced or polygonal-shaped portion 8, the latter being adapted to be engaged by a wrench when the pipe 4 is applied to or removed from the pipe 1.

Within the enlarged central portion of the pipe 4 is a cone-shaped valve seat 9 to receive a similar shaped valve 10 provided at its upper end with a reduced and notched boss 11, and at its lower end with a stem 12 arranged in the lower cylindrical portion 7 of the pipe 4 and having secured on it an X-shaped head 13. This head 13 has its arms slidably engaged with the cylindrical bore of the end 7 of the pipe 4 and it is retained in position by a screw 14 passed upwardly through its center and into a threaded opening in the stem 12. A coil spring 15 is arranged in the reduced inner or upper portion of the pipe 4 and has one of its ends engaged with the interior of the pipe 1 and its other end bearing on the valve 10, whereby the latter will be held on its seat 9.

The carriage 3 comprises a cylindrical body member 16 formed at its upper end with two upstanding parallel arms 17 between which is arranged a reinforcing ring 18. These arms have adjustably mounted on their upper portions Y-shaped side plates 19, the depending stems if which are formed with longitudinal slots 20 to receive clamping bolts 21. The latter are arranged in the upper portions of the arms 17 and the lowermost bolts 21 also serve to fasten the ring 18 to said arms, as clearly shown in Fig. 2. The upstanding branches or arms of the Y-shaped plates 19 are formed with upwardly and inwardly inclined lugs 22 which have screw threaded openings to receive pivot screws 23 for grooved track wheels 24. The wheels 24 on opposite branches of the two plates 19 are disposed in converging planes owing to the angular or inclined disposition of the screws 23.

Screwed into the lower end of the body portion 16 of the carriage is a pipe section 25 which serves as a tubular guide and casing for a two-part coupling pipe 26. This coupling pipe 26 consists of upper and lower sections 27, 28, having a screw threaded connection, the upper section 27 having at its upper end an enlargement or head 29 formed with an annular recess or seat 30 which provides an inner annular flange 31 to engage the head 13 on the stem of the valve 10, and to enter the lower end 7 of the pipe 4 to lift the valve against the tension of its spring 15. The formation of the groove or seat 30 also forms an outer annular flange 32 which is flared outwardly and is of greater length than the flange 31, whereby the coupling pipe will be readily guided on to the lower end of the pipe 4. One or more packing rings 33 are arranged in the groove or seat 30 for engagement with the lower edge of the pipe 4, whereby a water-tight joint will be effected. The coupling pipe is forced upwardly into engagement with the pipe 4 by means of a coil spring 34, which latter surrounds the lower pipe section 28 and has its upper end bearing against the upper section 27 of said pipe, and its lower end bearing against a ring 35 arranged in a semi-spherical cap 36 which is screwed on the lower end of the pipe 25. The cap or cup 36 is formed with a central opening to receive the pipe section 28, and also with a slot 37 extending radially from its central opening and adapted to receive a pin 38 projecting radially from the pipe section 28. This pin 38 is provided for the purpose of retaining the coupling pipe 26 in its retracted position, and it will be seen that this is accomplished by pulling the coupling pipe downwardly and then turning it slightly to move the pin 38 out of the slot 37 and against the lowermost portion of the cap 35. The lower end of the pipe section 28 has screwed on it a sleeve 39, to which latter is adapted to be screwed a coupling or connection 40 on the hose 2.

The supply pipe 1 is composed of pipe sections united by the T-connections 6 and it is preferably suspended by right angular hangers 41 having depending or vertical arms screwed into threaded openings in the tops of certain of the connections 6, and horizontal arms provided with apertured attaching plates 42. Owing to this shape and arrangement of the pipe hangers 41 it will be seen that the carriage 3 may readily pass the hangers, since the opposing wheels 24 on the carriage are spaced apart sufficiently to permit of the passage of the vertical branches of the hanger.

In operation, it will be seen that by pulling downwardly on the coupling pipe 26 the flanged head 29 at the top of said pipe may be disengaged from the lower end 7 of one of the outlet pipes 4, whereupon the carriage may be shifted longitudinally of the track or pipe 1 and into engagement with another of the pipes 4. While the carriage is thus shifted the coupling pipe may be retained in its retracted position by turning it slightly to disaline the pin 38 and slot 37. When said coupling pipe is retracted the spring 15 seats the valve 10 so as to prevent the escape of the water or fluid from the pipe 1. After the carriage has been moved into its new position and the coupling pipe 26 is disposed opposite one of the pipes 4, said coupling pipe is turned slightly to realine the pin 38 with the slot 37, whereupon the spring 34 forces the coupling pipe upwardly and causes its inner flange 31 to engage the head 13 on the stem of the valve 10, and thereby raise and open the valve so that the water may pass to the hose 2.

Having thus described the invention, what is claimed is:

An apparatus of the class described embodying a supply pipe having a plurality of branches projecting from the lower side thereof, each branch having a valved outlet pipe, a carriage swung from and adapted to travel on the supply pipe and a discharge pipe movable vertically in the carriage and carried by the same, a coupling at the upper end of the discharge pipe to detachably engage any of the outlet pipes, a spring to move the coupling upwardly, together with the discharge pipe, and means to lock the discharge pipe and coupling in a lowered position when the coupling is disconnected from all of the outlet pipes.

In testimony whereof I hereunto affix my signature in the presence of two witnesses.

NATALIN BACIGALUPI.

Witnesses:
 JOHN CELLO,
 JOSEPH COSTA.

---

Copies of this patent may be obtained for five cents each, by addressing the "Commissioner of Patents, Washington, D. C."